United States Patent
Frazier et al.

(10) Patent No.: US 9,090,351 B1
(45) Date of Patent: Jul. 28, 2015

(54) AIRCRAFT LUGGAGE BIN ATTACHMENT AND STOP SYSTEM

(71) Applicant: Heath Tecna Inc., Bellingham, WA (US)

(72) Inventors: Joe Frazier, Bellingham, WA (US);
Juha Marttila, Bellingham, WA (US);
Scott Jackson, Bellingham, WA (US);
Jordan Bridges, Bellingham, WA (US);
Tony Corless, Bellingham, WA (US)

(73) Assignee: Heath Tecna Inc, Bellingham, WA (US)

( * ) Notice: Subject to any disclaimer, the term of this patent is extended or adjusted under 35 U.S.C. 154(b) by 0 days.

(21) Appl. No.: 14/132,979

(22) Filed: Dec. 18, 2013

(51) Int. Cl.
*B64D 11/00* (2006.01)

(52) U.S. Cl.
CPC .................................... *B64D 11/003* (2013.01)

(58) Field of Classification Search
CPC ............ B64D 11/003; E05Y 2900/502; E05Y 2900/538; F16C 11/04
See application file for complete search history.

(56) References Cited

U.S. PATENT DOCUMENTS

| | | | |
|---|---|---|---|
| 4,718,586 A | 1/1988 | Hagino | |
| 5,383,628 A * | 1/1995 | Harriehausen et al. | 244/118.1 |
| 6,769,831 B2 | 8/2004 | Aquino et al. | |
| 7,128,295 B2 | 10/2006 | Scown | |
| 7,601,004 B2 | 10/2009 | Lamoree et al. | |
| 7,762,737 B2 | 7/2010 | Schmitz et al. | |
| 8,146,227 B2 | 4/2012 | Schmitz et al. | |
| 8,702,037 B2 * | 4/2014 | Schmitz et al. | 244/118.5 |
| 2006/0132007 A1 * | 6/2006 | Beckley | 312/325 |
| 2006/0151668 A1 | 7/2006 | Scown | |
| 2008/0055836 A1 * | 3/2008 | Lamoree et al. | 361/683 |
| 2012/0091734 A1 * | 4/2012 | Schendel et al. | 292/126 |
| 2013/0247330 A1 * | 9/2013 | Daul et al. | 16/319 |
| 2014/0197721 A1 * | 7/2014 | Savian et al. | 312/248 |

* cited by examiner

*Primary Examiner* — Valentina Xavier
(74) *Attorney, Agent, or Firm* — Dwayne E. Rogge; Schacht Law Office, Inc.

(57) ABSTRACT

A luggage bin attachment system and an interoperating luggage bin stop system are disclosed herein. The bin attachment system having a carriage pivotably mounted to a bin housing, and an end wall bracket fixedly attached to a luggage bin wherein the end wall bracket can be slidably attached to the carriage and temporarily supports the bin without fasteners there between. An adjustable pivot stop is also disclosed which in one example interoperates with the bin attachment system.

14 Claims, 9 Drawing Sheets

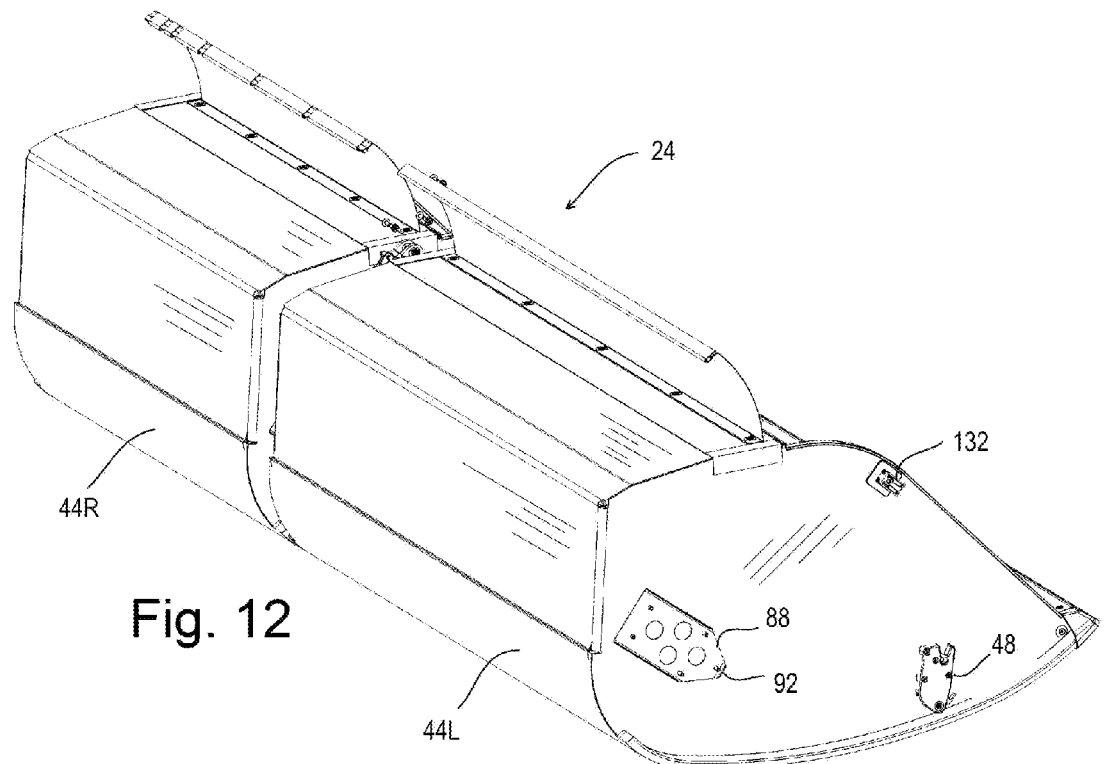
Fig. 12
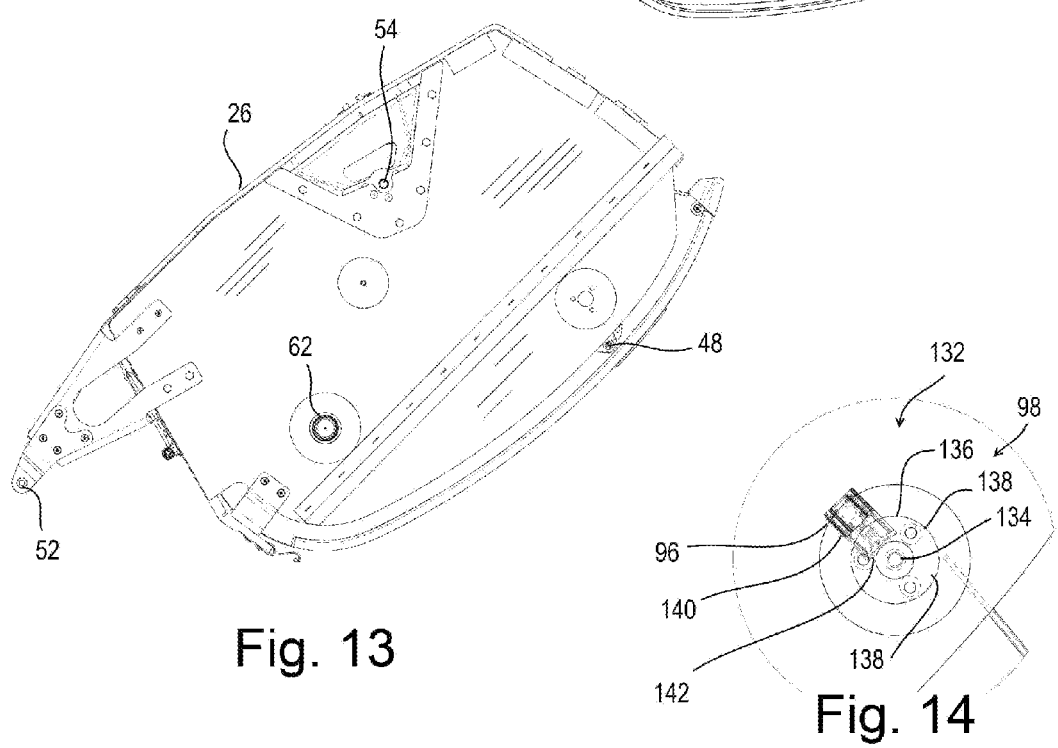
Fig. 13
Fig. 14

AIRCRAFT LUGGAGE BIN ATTACHMENT AND STOP SYSTEM

BACKGROUND OF THE DISCLOSURE

Field of the Disclosure

This application relates to the field of aeronautics, specifically aircraft structures for load (luggage) accommodation.

BRIEF SUMMARY OF THE DISCLOSURE

A luggage bin attachment system for coupling a luggage bin in one example having longitudinally opposed bin end-walls defining in part an interior space to a bin housing having longitudinally opposed housing end-walls defining in part an interior space. The attachment system in one example comprises on each bin end-wall; an end wall bracket. The end wall bracket fixed to an outward longitudinal surface of the bin end-wall. The end wall bracket having carriage receiving surfaces provided to receive a carriage plate. The end wall bracket overlying a plurality of surfaces defining fastener voids through the bin end-wall.

On each housing end-wall of the bin housing in one example, a carriage is pivotably attached to an inner longitudinal surface of the bin housing. The carriage includes end wall bracket receiving surfaces which engage the carriage receiving surfaces of the end wall bracket and temporarily affix the end wall bracket and attached luggage bin to the carriage and attached bin housing. The end wall bracket receiving surfaces and carriage receiving surfaces prohibit rotation between the carriage and the end wall bracket.

On each carriage in one example; surfaces defining threaded fastener voids are longitudinally aligned with the fastener voids through the bin end-wall. A plurality of semi-permanent mechanical fasteners passing through surfaces defining voids though the longitudinal end-wall, through the end wall bracket, and into the threaded fastener voids within the carriage to fasten the carriage to the end wall bracket.

The attachment system as recited above may further comprise an opening damper extending between the housing end-wall and the carriage.

The attachment system as recited above may be arranged wherein the opening damper is a compression damper.

The attachment system as recited above may further comprise a lift assist mechanism extending between the housing and the carriage.

The attachment system as recited above may be arranged wherein the opening damper is attached to the carriage at one of the bin end-walls, and a lift assist mechanism is provided on the opposing bin end-wall The attachment system as recited above may be arranged wherein the bin housing contains a pair of independently positionable luggage bins, a central housing wall of the bin housing provides separation between the luggage bins, the opening damper is provided on opposing longitudinal housing end-walls, and the lift assist mechanism is attached at one end to the central housing wall.

The attachment system as recited above may be arranged wherein the central housing wall has a surface defining a lift assist mechanism opening therein and the lift assist mechanism is positioned at least partially within this lift assist mechanism opening.

The attachment system as recited above may further comprise a lift assist mechanism extending between the housing and the carriage.

The attachment system as recited above may further comprise a carriage slide stop on each end wall bracket.

The attachment system as recited herein may be arranged wherein all attachments between the bin and the bin housing are made through the carriage.

Also disclosed herein is a luggage bin stop system between a luggage bin having longitudinally opposed bin end-walls defining in part an interior space, and a bin housing having longitudinally opposed housing end-walls, the stop system comprising in one example: a surface defining a void in each bin end-wall, a pivot stop outer housing attached to the bin end-wall and having a void therein aligned with the void in the bin end-wall, a pivot stop engagement portion positionably attached to the pivot stop outer housing. A threaded fastener is also disclosed, passing through the bin end-wall and engaging the pivot stop engagement portion to selectively adjust friction between the pivot stop engagement portion and the pivot stop outer housing. A pivot stop pin is attached to the housing end-wall and protrudes towards the adjacent bin end-wall. In a bin open position, the pivot stop engagement portion engages the pivot stop pin and prohibits rotation of the bin in the opening direction.

The luggage bin stop system as recited above in one example further comprises a system of parallel teeth and grooves on a contact surface of the pivot stop engagement portion, and the teeth and grooves on the pivot stop engagement portion in contact with the pivot stop outer housing so as to form an indexing system therebetween.

The luggage bin stop system as recited above in one example further comprises a system of parallel teeth and grooves on a contact surface of the pivot stop outer housing, and the teeth and grooves on the pivot stop outer housing in contact with the teeth and grooves on the pivot stop engagement portion so as to form the indexing system therebetween.

The luggage bin stop system as recited above may be arranged wherein the pivot stop engagement portion comprises a concave pin engagement surface which contacts the pivot stop pin.

BRIEF DESCRIPTION OF THE SEVERAL VIEWS OF THE DRAWINGS

FIG. 12 is a rear isometric view of a pair of bins ready to be installed into a bin housing. The bin housing is not shown in this figure.

FIG. 13 is an end view of the example shown in FIG. 2 in a slightly opened orientation.

FIG. 14 is a detail view of one example of a bin pivot stop assembly.

DETAILED DESCRIPTION OF THE DISCLOSURE

Disclosed herein is for improvements to standard luggage and storage bins commonly found in commercial aircraft as well as other aircraft, buses, passenger vans, and other vehicles. The invention is particularly applicable where it is desired to fit as many passengers as can be comfortably fitted within a relatively confined interior space of the vehicle. As passengers commonly arrive with luggage and other carry-on items; effective storage of such items is continually a concern.

A great number of inventions have been conceived to overcome the problem of correctly storing carry-on items such as the overhead storage compartments disclosed in U.S. Pat. No. 7,762,737 and U.S. Pat. No. 7,128,295; installation of such storage compartments takes manpower and time which is a significant financial and downtime cost to the owner of the vehicle. Such installation is often desired for initial construction of a vehicle or in an aftermarket retrofit of a vehicle.

Figure 1:
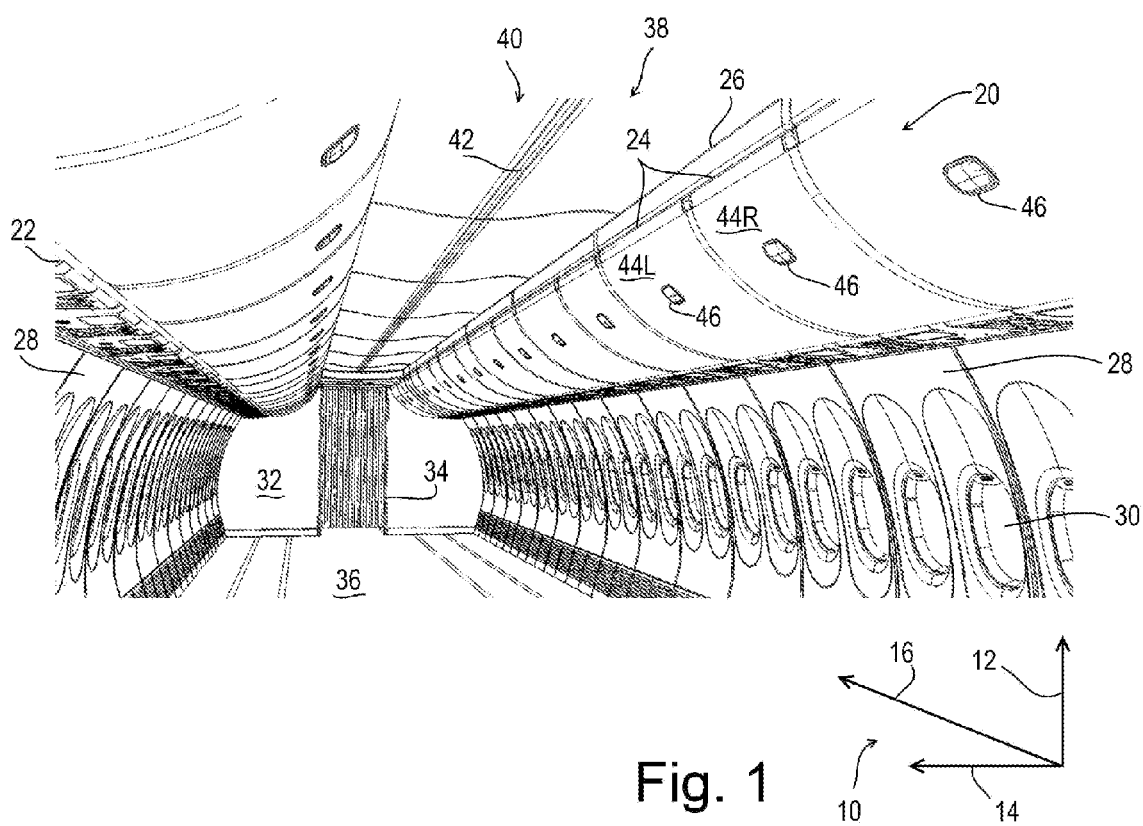
FIG. 1 is an environmental view of the interior of a commercial passenger aircraft showing one example of luggage bins installed with the disclosed apparatus.
Figure 2:
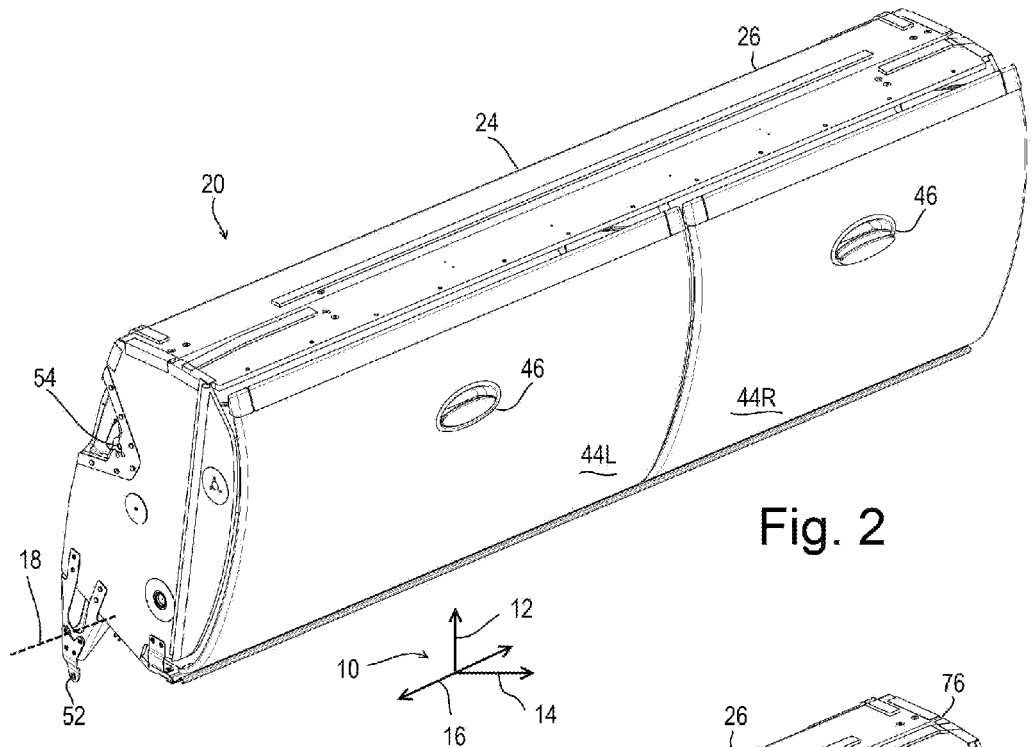
FIG. 2 is a front isometric view of one example of a closed bin pair within a bin housing.

Disclosed herein is an aircraft luggage bin attachment and stop system 20. One example of the system 20 is shown in FIG. 1. Before continuing; a detailed description of the system 20, an axes system 10 will be defined to assist in a more accurate and detailed description of the components and operation of the device. Looking to FIG. 1 is shown such an axes system 10 comprising a vertical axis 12 (with the arrow shown pointing in an upward direction). Also shown in the figures is a longitudinal axis 16 which is shown aligned with the long axis of the fuselage of an aircraft 22. The longitudinal axis 16 is shown in FIG. 2 aligned with (parallel to) the long axis of a bin pair 24. The longitudinal axis 16 may alternatively be aligned with the long axis of a single bin 44. The transverse axis 14 is defined as perpendicular to both the vertical axis 12 and the longitudinal axis 16. A rotational axis 18 is shown in FIG. 2 as generally parallel to the longitudinal axis, and centered upon an axis of rotation of the bins 44. This axis of rotation and the pivot of the bins will be described in more detail in this disclosure. These axes are intended for reference purposes in this disclosure only and are not to be interpreted as limitations of the invention. The invention as a whole; and the components therein may be assembled, installed and utilized in other orientations.

Looking to FIG. 1 is shown interior surfaces of the aircraft 22 with seating and other components removed therefrom. The longitudinal walls 28 or bulkheads are shown with windows 30 installed therein. At the longitudinally distant end of the aircraft interior 38 is shown a transverse bulkhead 32 with a aisleway 34 therein. Such aislways generally lead to another cabin or entry area. At the vertical bottom of this drawing is shown a floor 36 of the interior portion 38 of the aircraft 22. Generally the interior space will contain a plurality of seats or other furniture and storage components not shown in this figure as they form no significant part of the invention.

The vehicle (aircraft) interior 38 also comprises a ceiling 40 which in this example has a center seam 42 separating left and right ceiling panels. A plurality of bins 44 are shown attached between the walls 28 and the ceiling 40 in a manner to be discussed in more detail. The bins are likely not secured to the decorative outer panels of the ceiling and walls, but more likely to a bin housing which is in turn attached to a framework of the vehicle. The decorative ceiling and wall panels are commonly attached to this same vehicle framework.

In the example shown in the figures, the system 20 comprises several bin pairs 24. Each bin pair 24 comprising a left bin 44L and a right bin 44R within a bin housing 26. To simplify disclosure of the invention, an alphanumeric labeling system is used herein to differentiate similar components. For example; the bins are generally labeled 44 whereas adjacent bins 44 within a bin pair are labeled 44L and 44R to differentiate specific left and right bins. Each bin 44 in this example comprises a separate operating (latch release) handle 46. Each operating handle 46 connecting to a latch 48 having a release mechanism such that when the latch 48 engages an associated pivot stop pin 98 on the bin housing 26 when the bin 44 closes, the bin 44 will remain in the closed position until the operating handle 46 is engaged to release the latch 48. This latch mechanism and release handle will be described in more detail. Such latches 48 are known in the art and as can be seen in more detail in. FIG. 12.

Looking to FIG. 2, a mounting system is shown whereupon the bin housing 26 may be fixedly and releasably attached to the frame or other structure of the aircraft 22. In this example, a plurality of mounting points 52 and 54 are provided on each end of the bin housing 26 to attach the bin housing 26 to the aircraft 22 between the walls 28 and the ceiling 40. The upper surface of the bin housing may also comprise a 9G attachment system to the frame. Such a 9G attachment system is not shown in the drawings.

Figure 3:
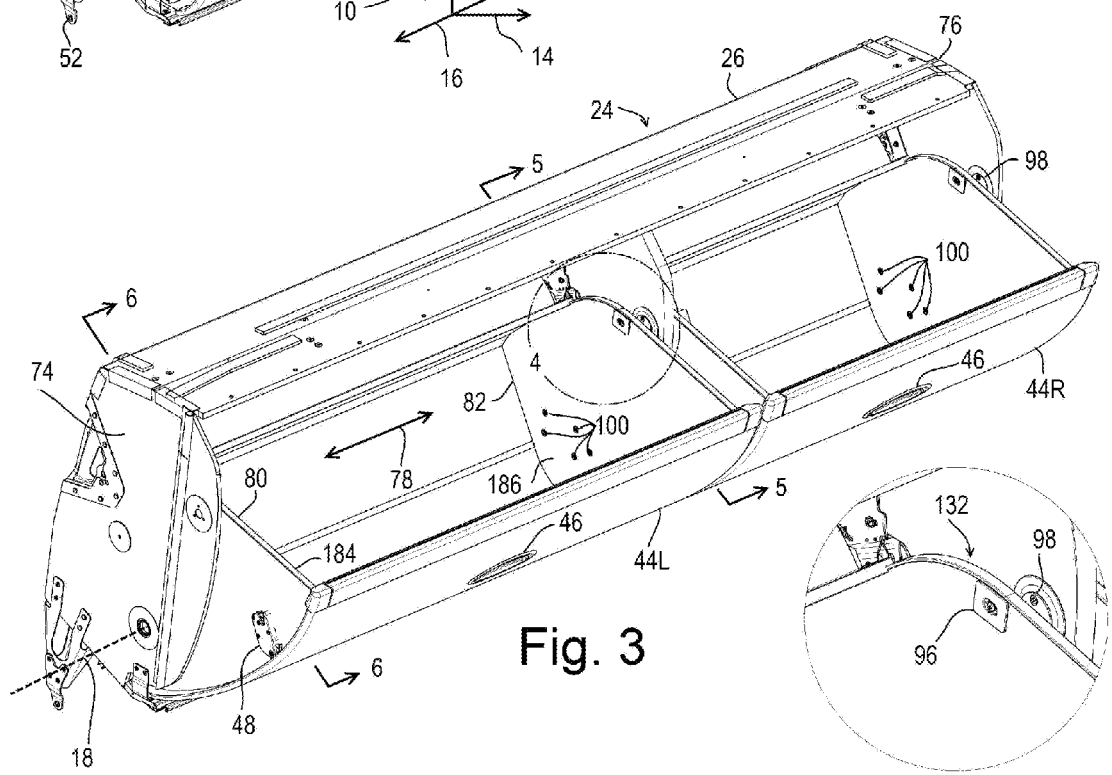
FIG. 3 is a front isometric view of one example of an open bin pair within a bin housing.
Figure 4:
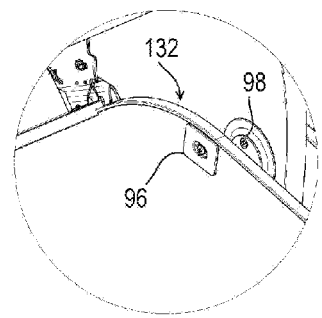
FIG. 4 is a detail view of the area 4 shown in FIG. 3
Figure 7:
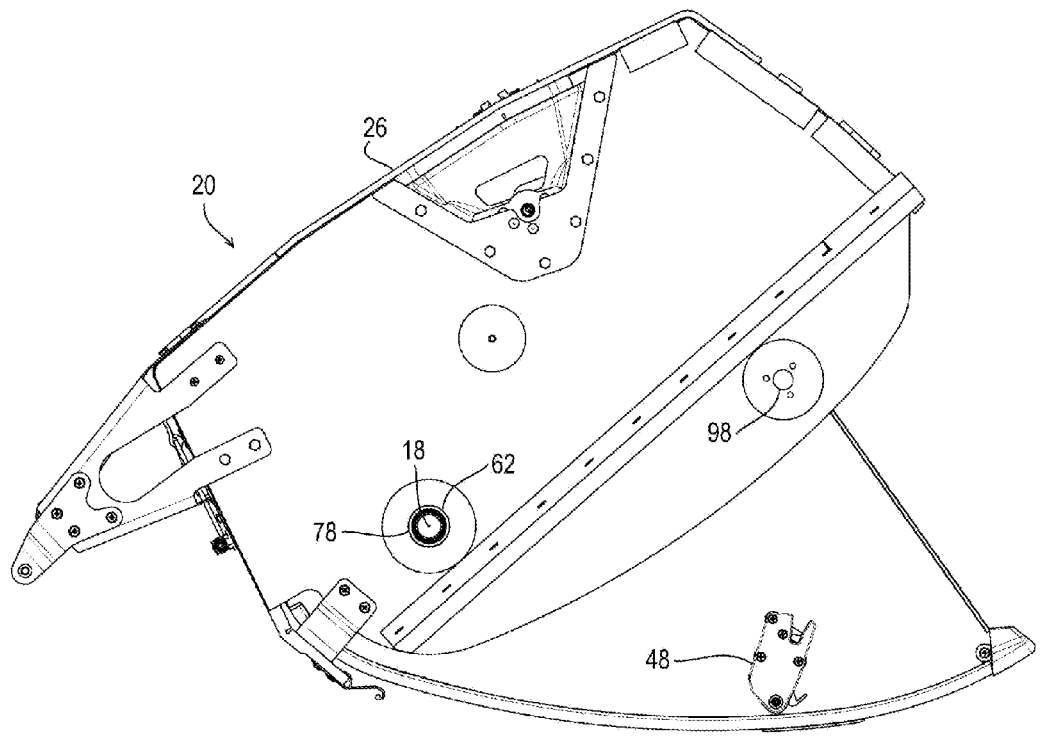
FIG. 7 is a side (end) view of the assembly shown in FIG. 3.
Figure 8:
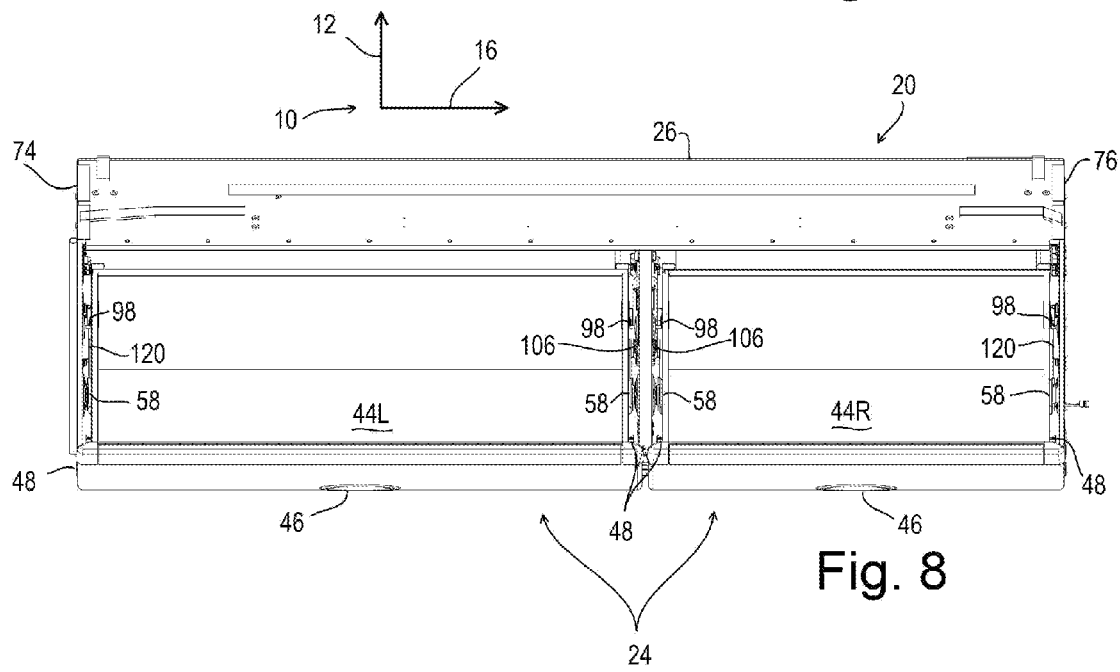
FIG. 8 is a front view of the assembly shown in FIG. 3.

FIG. 2 shows the bins 44 in the closed position. In FIG. 3, the latch 48 has been released and the bins 44L and 44R have been rotated about the axis 18 to a partially opened position. FIG. 7 shows the bins in a fully open position. In a fully open position, it is relatively easy for a passenger or crew member to remove or place luggage and other carry-on items into the interior of the bin 44 for storage. Generally, the bins 44 are located vertically above the passenger seats of the vehicle, allowing comfortable headroom between the passengers and the bins at least when the bins are in the closed position. When a vehicle (aircraft) is motion, it is customary to leave the bins 44 in the closed position as shown in FIG. 2 and latched so as to securely retain the carry-on items there within.

Figure 5:
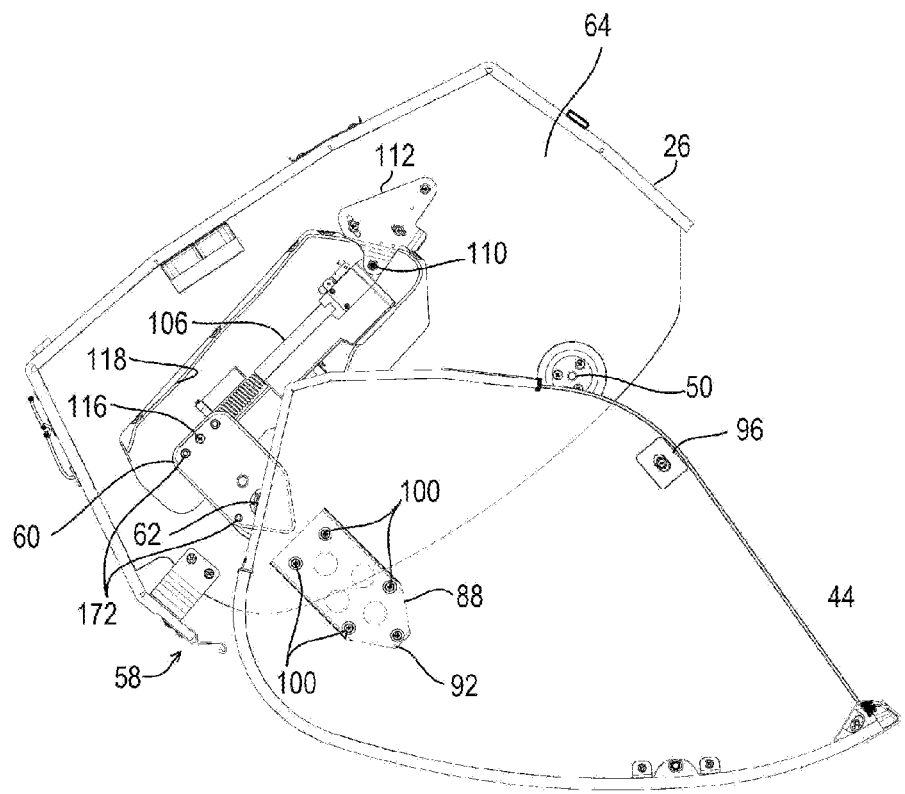
FIG. 5 is a partially assembled side cutaway view taken along line 5-5 of FIG. 3.

Looking to FIG. 5, a side cutaway view of the center portion of FIG. 3 shows the implementation of a cartridge system 58. The cartridge system 58 comprises a carriage 60 having a pivot 62 centered upon and aligned with the axis 18 of each bin on each end of the bins 44. One of the pivots 62 of each bin may be fixed to a middle transverse bulkhead 64 and allowed to rotate therewith. Looking to FIG. 9 for example, the carriage 60 can be seen with the pivot 62 which in this example utilizes a washer 72 fitted about the pivot 62 along with a bushing 66 also fitted about the pivot protrusion 62. The bushing 66 in this example is fitted within a pivot receiver 68 having fasteners 70 so as to allow fixed mounting of at least a portion of the pivot receiver to the middle bin bulkhead 64. In other examples such as for example FIG. 7, the left bin housing wall 74 and right bin housing wall 76 may have a surface defining a void 78 utilized independent of, or in cooperation with, the pivot receiver 68 to engage the outer surface of the bushing 66. In one example, this arrangement allows for a relatively long pivot protrusion 62 to be utilized within a relatively shallow pivot receiver 68 to maximize the internal width 78 (storage volume) of each bin 44 between internal surfaces 80 and 82 of the bin end-walls 184 and 186 and maintain structural integrity of the system.

Figure 6:
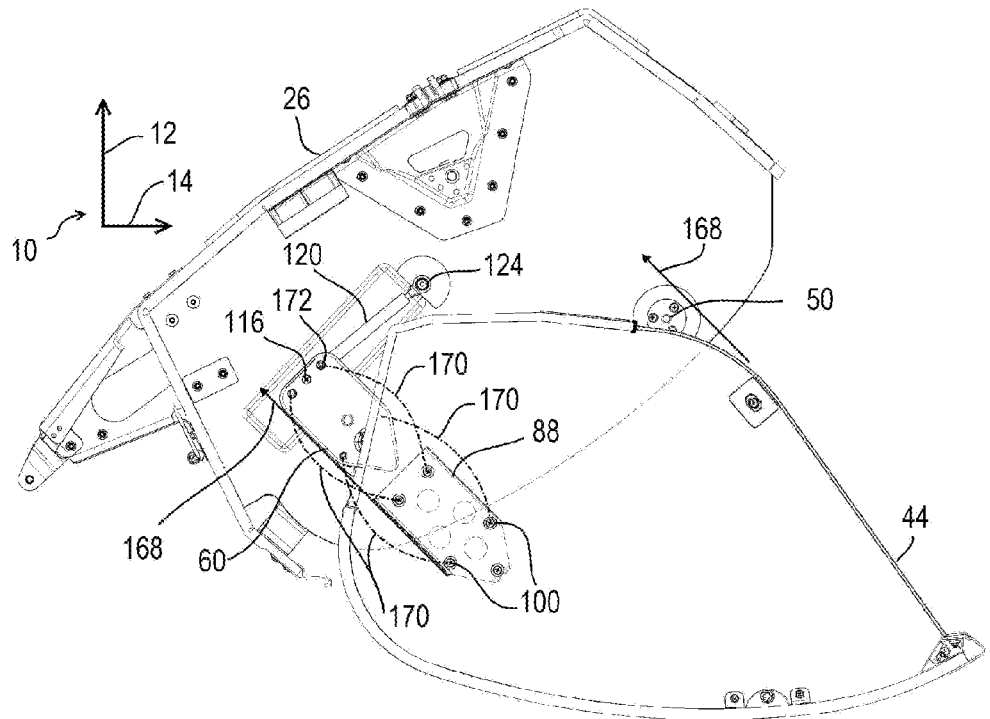
FIG. 6 is a partially assembled side cutaway view taken along line 6-6 of FIG. 3.
Figure 9:
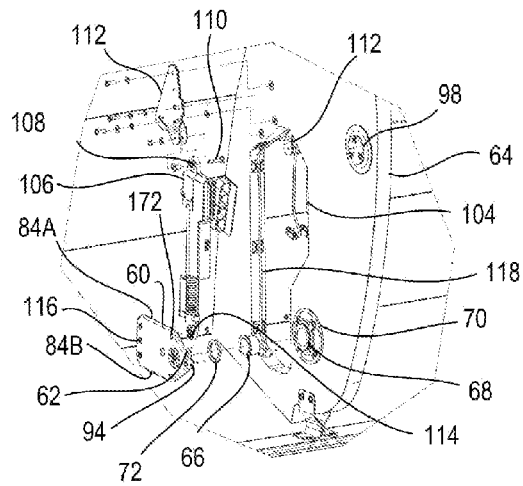
FIG. 9 is a partially assembled view of one example of a bin assist mechanism being installed in the assembly shown in FIG. 3.
Figure 11:
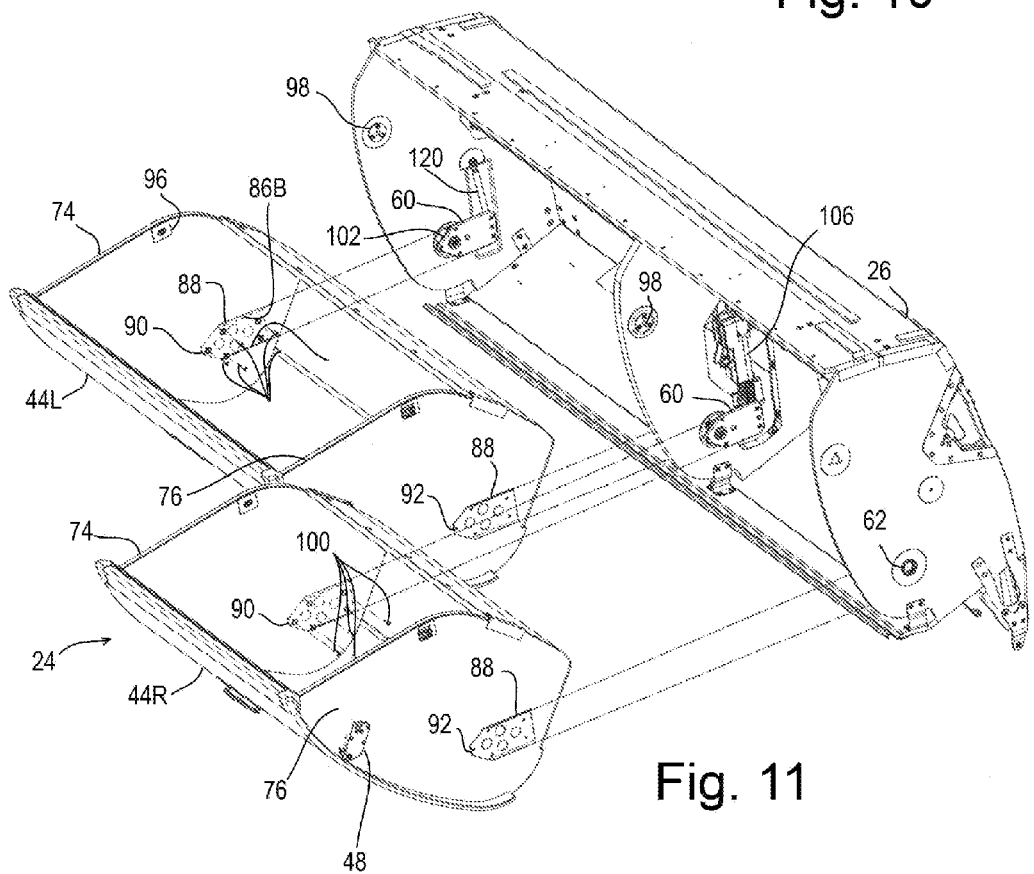
FIG. 11 shows one example of a pair of bins being installed into a bin housing.
Figure 15:
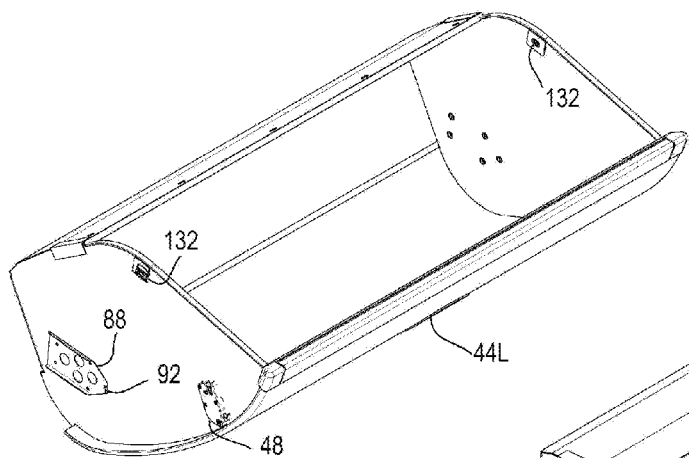
FIG. 15 is a side isometric view of one example of a left (long) bin to be installed in a bin housing.
Figure 16:
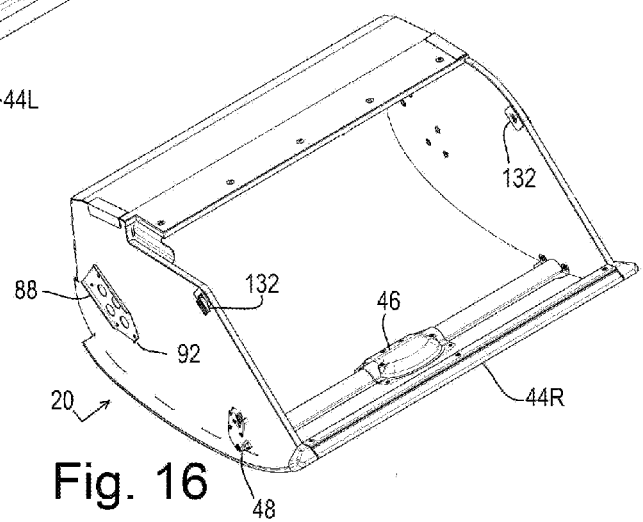
FIG. 16 is a side isometric view of one example of a right (short) bin to be installed in a bin housing.
Figure 17:
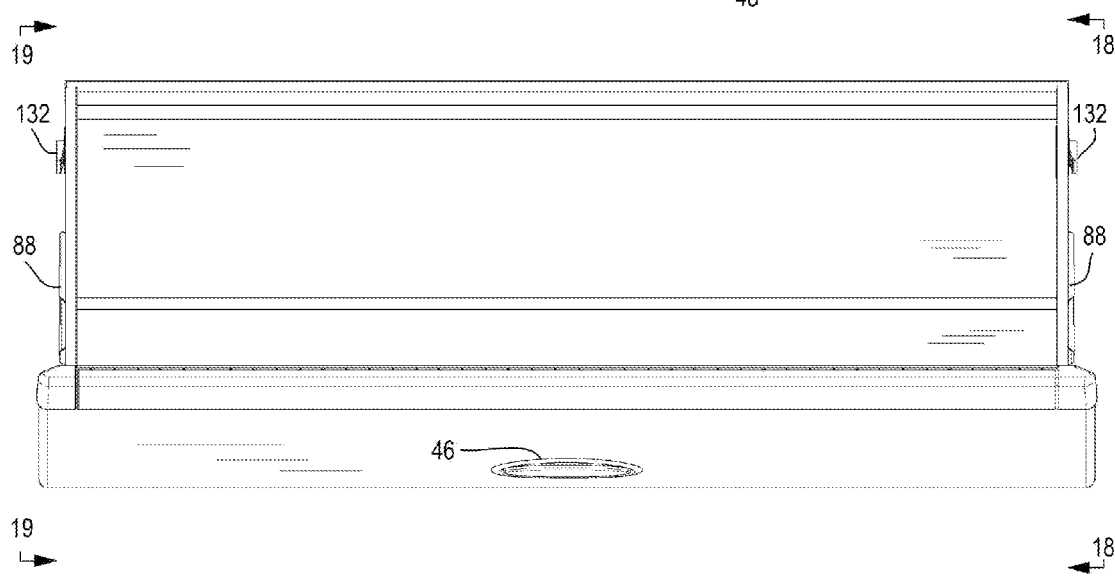
FIG. 17 is a front view of the left bin shown in FIG. 15 in a partially lowered position.
Figure 18:
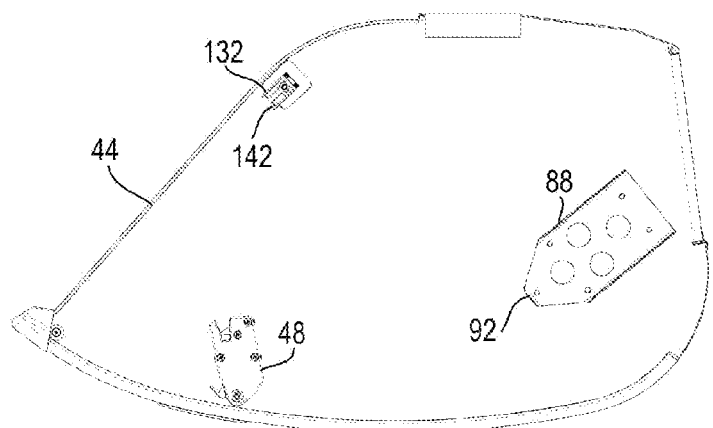
FIG. 18 is an end view seen from line 18-18 of FIG. 17.
Figure 19:
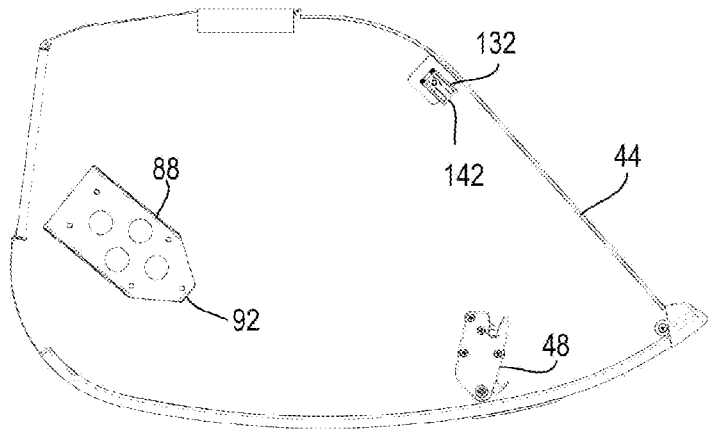
FIG. 19 is an end view seen from line 19-19 of FIG. 17.
Figure 20:
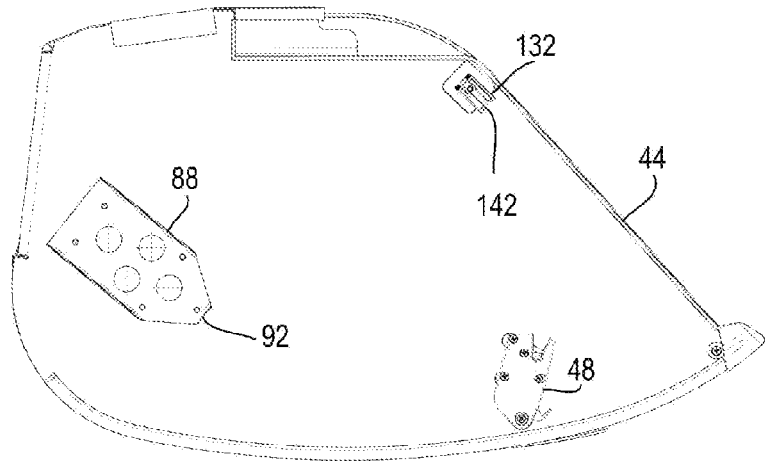
FIG. 20 is an end view seen from line 20 of FIG. 16.
Figure 23:
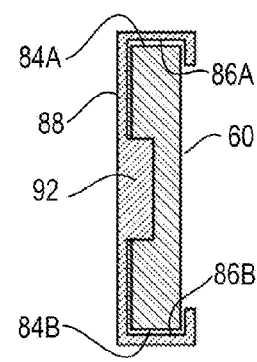
FIG. 23 is a highly schematic end view of one example of a carriage attached to an end wall bracket.

Looking to FIG. 9, it can be appreciated how in this example the carriage 60 comprises end wall bracket receiving surfaces 84A and 84B on upper and lower surfaces of the carriage 60 respectively. The end wall bracket generally forms a receptacle for the carriage plate. The undetailed view of FIG. 23 shows these surfaces more closely, and without adjacent structures. FIG. 23 shows a gap between the end wall bracket and the carriage 60 for illustrative purposes, but in actual use this gap may be reduced or eliminated. The end wall bracket receiving surfaces 84A and 84B are configured to engage carriage receiving surfaces 86A and 86B respectively of an end wall bracket 88 in a sliding manner. FIG. 6 shows arrows 168 depicting the direction the bin may to be repositioned in order to engage the end wall bracket 88 onto the carriage 60. Arcs 170 show the fasteners 100 moving to a position where they are aligned with surfaces defining threaded voids 172 in the carriage. The fasteners 100 passing also through surfaces defining voids 174 (FIG. 5) in the end wall bracket 88 and voids 176 (FIG. 21) through the bin wall into which the fasteners 100 pass. The end wall bracket 88 in one form is affixed to the outer surfaces of bin walls 74 and 76 by way of fasteners 90 (FIG. 11). In one form, each end wall bracket 88 comprises a slide stop 92 to limit movement in direction 168. As the end wall brackets and attached bins 44 are slid into position on the associated carriages 60, the slide stop 92 will engage (contact) a surface 94 on each carriage 60 giving a tactile and audible response that the bin is fully in position upon the carriage 60. Looking to FIG. 11, it is to be understood that these examples of the end wall brackets 88 are fixed to the outer surface of the bin walls 74/76. The end wall brackets 88 shown with dashed lines would be hidden from view given an opaque bin wall 74.

A pivot stop assembly is also shown comprising a pivot stop pin 98 mounted to the bin housing 26 and a pivot stop receptacle 96 mounted to the bin 44 or vice versa. During installation of the bins 44 into the bin housing 26, the pivot stop pin 98 may hinder movement of the bin 44. While a more detailed explanation is forthcoming, during installation it will often be required to adjust the line of travel (installation) 168 vertically so as to position the pivot stop receptacle 96 past the pivot stop pin 98. Once the end wall bracket 88 is fully engaged with the carriage 60 and the bin 44 rotated to a fully open position, the pivot stop receptacle 96 will contact the pivot stop pin 98 with the bin 44 in the fully open position and the bin 44 will be suspended in that position temporarily without tools, fasteners or other supports between the bin 44 and the bin housing 26 except the cartridge assembly 58 and the pivot stop assembly 132. This apparatus and installation method is quite different than other prior art installation procedures wherein multiple contact points were provided between the bins and a bin housing. Such prior art systems commonly require additional support of the bin within the bin housing during installation of the bins such as a first installer holding the bin in position while other installers fasten the snubber, lift assist mechanisms etc. between the bin housing 26 and the bin 44 prior to self-support and full use of the bin.

As the attachment between the end wall bracket 88 and the carriage 60 is somewhat tenuous at this point in installation; it will generally not be desired to put a significant weight of carry-on items or other contents within the bins 44. However, in this position the bins 44 are self-supporting. Fasteners 100 may be passed from the interior portion of the bin 44 through the bin walls 74 and 76, through the end wall brackets 88 into fastener receiver voids 172 provided on/in the carriage 60. The fasteners 100 fixing the bins in place relative to the carriage 60 and thus allowing for significant weight capacity of each bin 44.

FIG. 9 shows the middle bin bulkhead 64 having a surface defining a void 104 provided therein for attachment of a lift assist mechanism 106. In this example, the upper portion of the lift assist mechanism 106 comprises a pivot 108 which utilizes a fastener 110 to attach the lift assist mechanism 106 to a lift assist bracket 112 such that the lift assist mechanism 106 is substantially within the void 104. This arrangement of components again reducing space requirements in order to maximize the width 78 of the interior of the bin 44 between interior surfaces of the bin walls 74/76. The lower end of the lift assist mechanism comprising a pivot 114 connecting to the carriage 60 in one form at a pivot 116 provided on the opposing end of the carriage 60 from the pivot 62 previously described. In this way, both the lift assist mechanism 106 and the pivot 62 connect the bin 44 to the bin housing 26 via a single carriage 60 which connects to the end wall bracket 88. This arrangement significantly reduces the attachment steps required for installing a bin 44 into a bin housing 26 by removing the additional steps of attaching a lift assist mechanism 106 and/or snubber 120 to the bin 44 and/or bin housing 26 after installing the bin 44.

In one form, the lift assist mechanism 106 may be coupled to a control line 118 which may be electric, pneumatic, hydraulic or otherwise powering or receiving sensing signal from the lift assist mechanism 106.

Comparing FIGS. 9 and 11 it can be seen how in one example, a single lift assist mechanism assembly 106 may comprise an actuator and pivot 114 on each of the left and right transverse sides of the lift assist mechanism 106 so as to engage (rotate) the left and right bins 44L and 44R respectively. In another example, the two lift assist brackets 112 shown in FIG. 9 may be utilized to attach separate lift assist mechanisms 106 to the bin housing 26.

Figure 10:
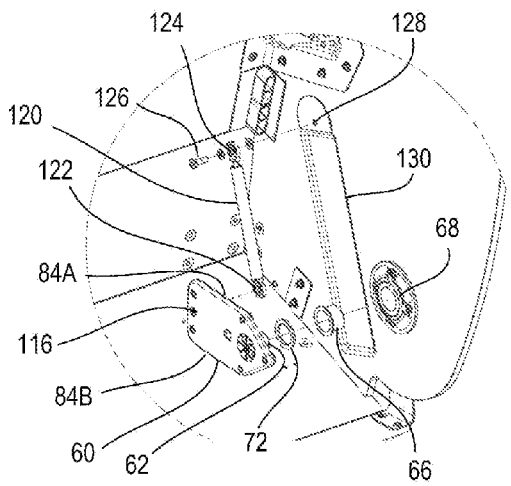
FIG. 10 is a detail view of one example of a partially assembled pivot cartridge and opening snubber.

Looking to FIG. 10, a snubber (damper) 120 is shown being connected to the pivot 116 of the carriage 60 by way of a pivot location 122 on the lower end of the snubber 120. The terms "damper" and "snubber" intended to define a device which check or retard the energy, action, etc., of an apparatus; to move in a controlled manner.

The upper portion of the snubber 120 in this example includes a pivot location 124 connecting by way of a fastener 126 to a pivot location 128 on the end-walls of the bin housing 26. Again to maximize the width 78 of the bin 44, the snubber 120 of this example is positioned at least partially within a surface defining an opening 130 formed within the bin middle transverse bulkhead 64. As with the lift assist mechanism 106; the snubber 120 and the adjacent pivot 62 in this example are provided on a single carriage 60. This arrangement significantly reducing the attachment steps required for installing a bin 44 into a bin housing 26 where many prior art devices required separate attachment of a snubber between the bin and the bin housing, and do not provide a method for fastening the pivot to the bin housing from inside the bin.

A compression dampener may be utilized to reduce the opening speed of the bin for the same purposes and to provide safety to any occupants who may be below the bin 44 in its rotation (opening) path.

In one form, the compression snubber 120 and/or the lift assist mechanism 106 in combination with the pivot 62 may be configured to fully support an open luggage bin while fully loaded.

In another example, a pivot stop assembly 132 may support some of the weight of the bin 44 and contents when the bin is in the fully open position and the latch 48 may support some of the weight of the bin 44 and contents in the fully closed position. In this example (FIG. 14) the pivot stop pin 98 comprises a protruding pin portion 134 and a base portion 136 which is fastened by way of fasteners 138 in this example to the bin housing. In another form, a pivot stop assembly 132 comprising the previously mentioned pivot stop receptacle 96 and pivot stop pin 98 may be utilized to maintain the bins 44 in the correct fully open orientation without "racking" or offset support of the bin 44. Such "racking" could lead to deformation of the bin 44 and/or bin housing 26.

Figure 21:
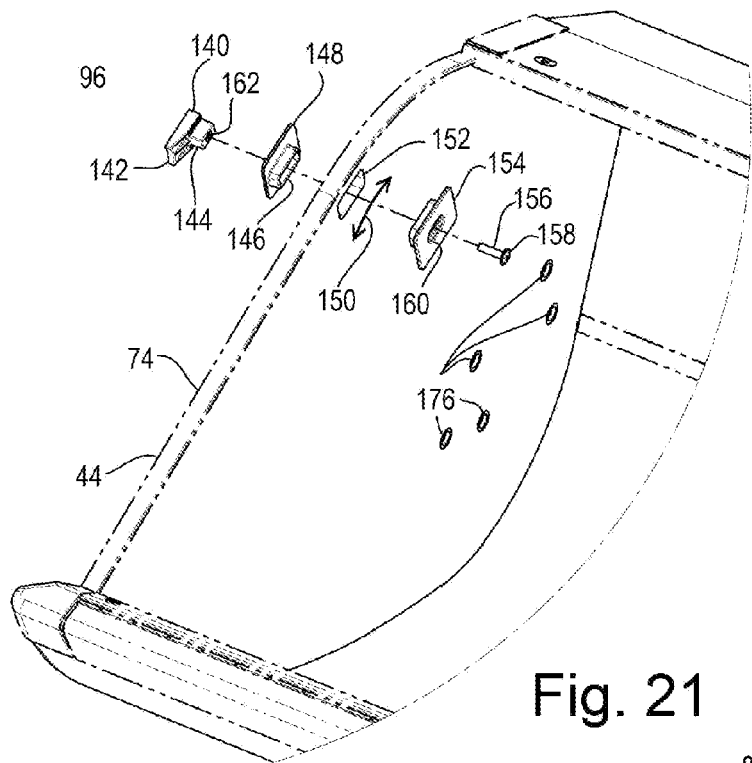
FIG. 21 is a front isometric view of one example of an exploded pivot stop receptacle.
Figure 22:
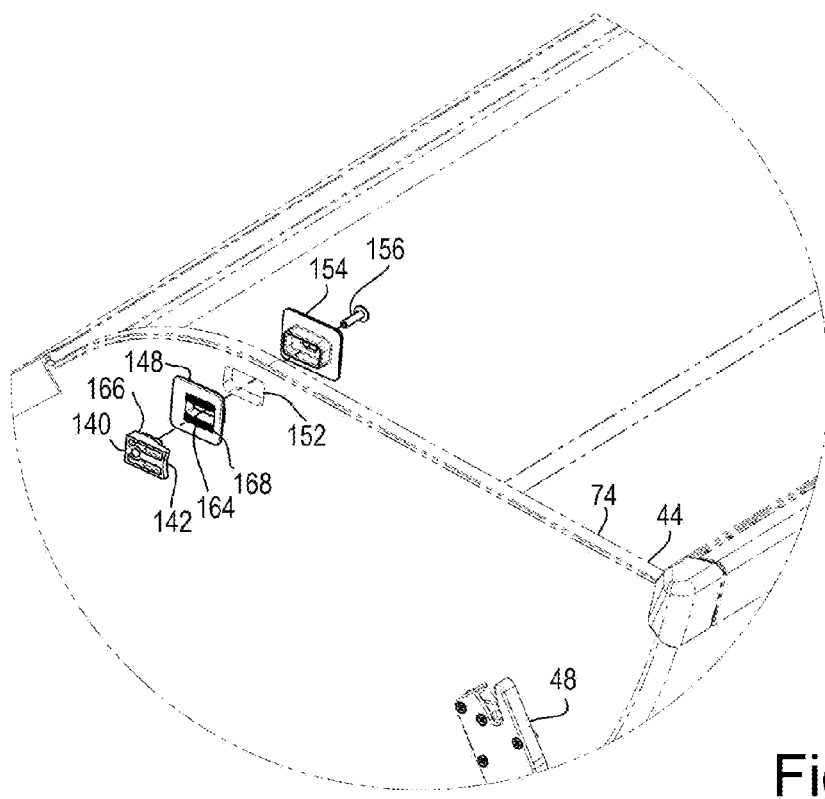
FIG. 22 is an end isometric view of one example of an exploded pivot stop receptacle.

The example of the pivot stop receptacle 96 is shown disassembled in FIGS. 21 and 22. As shown, the pivot stop receptacle 96 comprises a pin engagement portion 140 having on one end a pin engagement surface 142. Looking to FIG. 14, it can be seen how in this example the pin engagement surface 142 is concave so as to enhance contact with the pin 134 as the bin opens. Returning to FIG. 21-22 it can be appreciated how a protrusion portion 144 of this example of the engagement portion 140 fits within a surface defining an opening 146 of an outer housing 148. In this example, the opening 146 is substantially longer in direction 150 than the length in the same direction of the outer surfaces of the protrusion 144 so as to allow linear movement of the engagement portion 140 relative to the outer housing 148. This direction 150 is generally aligned with the radius from the rotation axis 18. As shown, the bin wall 74 comprises a surface defining a void 152 which is substantially as large as the surface 146 so as that the bin wall 74 does not prohibit movement of the engagement portion 140 relative to the bin wall 74. In one form, the surface 146 is an inner surface of a protrusion 178 extending longitudinally from the outer housing 148. In such an example, the void 152 may be sized to receive the protrusion 178 and/or an equivalent protrusion 180 of an inner housing 154

In one form, the pivot stop assembly 132 comprises the inner housing portion 154 which may be very similar to the outer housing portion 148. In this example, a threaded fastener 156 such as a screw or bolt may be used having a head 158 substantially larger than the opening 160 in the inner housing 154 such that the fastener 156 does not prohibit some degree of movement along the direction 150 within the surface 146 however, the surface 160 allows the fastener 156 to provide tensile force between the head 158, the inner housing 154, the outer housing 148, and a threaded void 162 within the engagement portion 140. Thus; as the fastener is screwed into the threaded void 162 and tightened, compressive force maintains all components in place. When sufficiently tensioned, the engagement portion 140 is no longer allowed to move either way in direction 150. Sufficient tension being defined as tension providing frictional force between the engagement portion 140 and the outer housing 148 to prohibit substantial linear movement there between. As with the fasteners 100, the fastener 156 is accessible from the interior portion of the bin so as to facilitate adjustment and proper positioning of the engagement portion 140 relative to the pin 98 when the bin is in the fully open position.

Looking to FIG. 22 it can be seen how in one example at least a portion of the outer surface 164 of the outer housing 148 and/or a portion of the inner surface 166 of the engagement portion 140 may comprise a textured surface further prohibiting movement of the engagement portion 140 relative to the bin 44 when the fastener 156 is sufficiently tensioned. In one form, teeth and grooves 168 are provided on the surface 164 and/or on the surface 166 to allow for small indexed movements of the engagement portion 140 relative to the bin 44 until the fastener 156 is tensioned. These teeth and grooves may be sawtooth shaped in cross section, and aligned perpendicular to the adjustment direction 150. This surface in one example comprises parallel channels and ridges similar to linear rack gears. By lessening tension of the fastener 156, the teeth and grooves 166 on the engagement portion 140 may move past the teeth and grooves 168 of the outer housing 148 to allow for very small indexed adjustment. Once tensioned, a very large force is required to overcome the frictional engagement and move the engagement portion 140 against the outer housing 148. Such force is generally not encountered in an application such as shown in these examples; even when the bins 44 are fully loaded with carry-on items.

When the bin is fully installed (and prior to loaded use) the bins are opened to a fully open position, the fastener 156 is released from inside the bin and the engagement portion 140 is moved until the pin engagement surface 142 contacts the pivot stop pin 98. The fastener 156 is then sufficiently tensioned so as to prohibit any further movement of the engagement portion 140 relative to the bin 44. Any following opening of the bin 44 will result in contact of the pin engagement surface 142 to the pivot stop and 98 adding to support of the bin and somewhat reducing strain upon the carriage 60 and other components attached thereto.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

The invention claimed is:

1. A luggage bin attachment system for coupling a luggage bin having longitudinally opposed bin end-walls defining in part an interior space, to a bin housing having longitudinally opposed housing end-walls defining in part an interior space, the attachment system comprising:
   a. on each bin end-wall, an end wall bracket,
      i. fixed to an outward longitudinal surface of the bin end-wall,
      ii. having carriage receiving surfaces,
      iii. overlying a plurality of surfaces defining fastener voids through the bin end-wall,
   b. on each housing end-wall of the bin housing, a carriage,
      i. pivotably attached to an inner longitudinal surface of the bin housing,
      ii. having end wall bracket receiving surfaces which engage the carriage receiving surfaces of the end wall bracket and temporarily affix the end wall bracket and attached luggage bin to the carriage and attached bin housing and prohibit rotation therebetween;

iii. surfaces defining threaded fastener voids longitudinally aligned with the fastener voids through the bin end-wall, and c. a plurality of semi-permanent mechanical fasteners passing through surfaces defining voids though the longitudinal end-wall, through the end wall bracket, and into the threaded fastener voids within the carriage to fasten the carriage to the end wall bracket.

2. The attachment system as recited in claim 1 further comprising an opening damper extending between the housing end-wall and the carriage.

3. The attachment system as recited in claim 2 wherein the opening damper is a compression damper.

4. The attachment system as recited in claim 2 further comprising a lift assist mechanism extending between the housing and the carriage.

5. The attachment system as recited in claim 4 wherein:
a. the opening damper is attached to the carriage at one of the bin end-walls, and
b. the lift assist mechanism is provided on the opposing bin end-wall.

6. The attachment system as recited in claim 5 wherein:
a. the bin housing contains a pair of independently positionable luggage bins,
b. a central housing wall of the bin housing provides separation between the luggage bins,
c. the opening damper is provided on opposing longitudinal housing end-walls, and
d. the lift assist mechanism is attached at one end to the central housing wall.

7. The attachment system as recited in claim 6 wherein the central housing wall has a surface defining a lift assist mechanism opening therein and the lift assist mechanism is positioned at least partially within this lift assist mechanism opening.

8. The attachment system as recited in claim 1 further comprising a lift assist mechanism extending between the housing and the carriage.

9. The attachment system as recited in claim 1 further comprising a carriage slide stop on the end wall bracket.

10. The attachment system as recited in claim 1 wherein all attachments between the bin and the bin housing are made through the carriage.

11. A luggage bin stop system between a luggage bin having longitudinally opposed bin end-walls defining in part an interior space, and a bin housing having longitudinally opposed housing end-walls, the attachment system comprising:
a. a surface defining a void in each bin end-wall,
b. a pivot stop outer housing attached to the bin end-wall and having a void therein aligned with the void in the bin end-wall,
c. a pivot stop engagement portion positionably attached to the pivot stop outer housing,
d. a threaded fastener passing through the bin end-wall and engaging the pivot stop engagement portion to selectively adjust friction between the pivot stop engagement portion and the pivot stop outer housing,
e. a pivot stop pin attached to the housing end-wall and protruding towards the bin end-wall,
f. where in a bin open position, the pivot stop engagement portion engages the pivot stop pin and prohibits rotation of the bin in the opening direction,
g. a system of parallel teeth and grooves on a contact surface of the pivot stop engagement portion, and
h. the teeth and grooves on the pivot stop engagement portion in contact with the pivot stop outer housing so as to form an indexing system therebetween.

12. The luggage bin stop system as recited in claim 11 further comprising:
a. a system of parallel teeth and grooves on a contact surface of the pivot stop outer housing, and
b. the teeth and grooves on the pivot stop outer housing in contact with the teeth and grooves on the pivot stop engagement portion so as to form the indexing system therebetween.

13. The luggage bin stop system as recited in claim 11 wherein the pivot stop engagement portion comprises a concave pin engagement surface which contacts the pivot stop pin.

14. The luggage bin stop system as recited in claim 11 further comprising: a bin latch having surfaces that interoperate with the pivot stop pin in a closed position to secure the bin in the closed position.

* * * * *